(12) United States Patent
Djama

(10) Patent No.: US 7,657,393 B2
(45) Date of Patent: Feb. 2, 2010

(54) SYSTEM FOR DETERMINING INFLATING PRESSURES OF TIRES MOUNTED ON A MOTOR VEHICLE WHEELS

(75) Inventor: Zahir Djama, Paris (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 0 days.

(21) Appl. No.: 11/996,959

(22) PCT Filed: Jul. 5, 2006

(86) PCT No.: PCT/FR2006/050677

§ 371 (c)(1),
(2), (4) Date: Jan. 25, 2008

(87) PCT Pub. No.: WO2007/012772

PCT Pub. Date: Feb. 1, 2007

(65) Prior Publication Data

US 2008/0177498 A1  Jul. 24, 2008

(30) Foreign Application Priority Data

Jul. 26, 2005 (FR) .................................. 05 07979

(51) Int. Cl.
*G01L 7/00* (2006.01)
(52) U.S. Cl. .................................................... 702/140

(58) Field of Classification Search ............... 702/98, 702/138, 140; 73/1.38, 146.2
See application file for complete search history.

(56) References Cited

U.S. PATENT DOCUMENTS 7,289,893 B2 * 10/2007 Gouriet et al. ................. 701/37

FOREIGN PATENT DOCUMENTS

EP  0455993 A  11/1991
FR  2858267 A  2/2005

OTHER PUBLICATIONS

Mayer, Model based detection of tyre deflation by estimation of a virtual transfer function, Control Applications, 1995, Proceedings of the 4th IEEE conference on Albany, NY, Sep. 28, 1995, pp. 285-290.
International Search Report mailed Feb. 13, 2007 in PCT/FR2006/050677.

* cited by examiner

*Primary Examiner*—Drew A Dunn
*Assistant Examiner*—Stephen J Cherry
(74) *Attorney, Agent, or Firm*—Nicolas E. Seckel

(57) ABSTRACT

The invention concerns a system for determining inflating pressures of tires mounted on a motor vehicle wheels, which includes acquiring vertical accelerations of a front wheel and of a rear wheel of the vehicle and estimating coefficients of stiffness of the tires of these wheels based on the acquired accelerations on another of the acquired accelerations, these coefficients of stiffness being estimated based on the thus temporally reset accelerations.

14 Claims, 4 Drawing Sheets

SYSTEM FOR DETERMINING INFLATING PRESSURES OF TIRES MOUNTED ON A MOTOR VEHICLE WHEELS

The present invention concerns a system for determining the inflating pressure of tires mounted on a motor vehicle wheels.

Such systems are known in the art, which use the vertical acceleration of one or several wheels of the vehicle to determine the coefficients of stiffness of the tires of these wheels, and to determine their inflating pressures from these coefficients.

However, these systems determine the profile of the roadway to determine the coefficients of stiffness, which poses precision problems because of the imperfect reconstruction of this profile.

An objective of the invention is to solve these problems by proposing a system of the above-mentioned type that does not use reconstruction of the profile of the roadway to calculate the inflating pressure of the tires.

To this effect, an object of the invention is a system for determining the inflating pressures of tires mounted on motor vehicle wheels, the system including:
means for acquiring vertical accelerations of a front wheel and of a rear wheel of the vehicle; and
means for estimating coefficients of stiffness of the tires of these wheels as a function of the acquired accelerations,
characterized in that it further comprises means for temporally resetting one of the acquired accelerations on the other of the acquired accelerations, and in that the estimation means are adapted to estimate said coefficients of stiffness as a function of the thus temporally reset accelerations.

According to particular embodiments, the system includes one or several of the following characteristics:
the temporally resetting means comprise means for calculating the inter-correlation of the acquired accelerations and means for applying a delay corresponding to the maximum of the calculated inter-correlation to the acquired acceleration of the front wheel;
the estimation means are adapted to perform a recursive least square algorithm in real time to estimate said coefficients of stiffness;
the estimation means are adapted to perform an inversion or deconvolution algorithm to estimate said coefficients of stiffness;
the system further comprises means for bandpass filtering the acquired accelerations arranged between means for acquiring the accelerations and the temporally resetting means;
the passband filtering means are adapted to perform filtering in a range of frequencies substantially equal to [8, 20] Hz;
the estimation means are adapted to estimate said coefficients of stiffness from a mono-wheel mechanical model of the front and rear wheels;
the estimation means are adapted to estimate said coefficients of stiffness based on a model in discrete time of the reset accelerations of the front and rear wheels according to the equation:

$$Avr(k) = \frac{1}{mrr}(mra \times Ava(k-n) \quad Zva(k-n) - Zvr(k))$$

$$\begin{pmatrix} Kpr(k)/Kpa(k) \\ Kpr(k) \end{pmatrix}$$

where k is the $k^{th}$ sampling instant, Avr and Ava are the vertical accelerations of the rear and front wheels, respectively, Zvr and Zva are the altitudes of the centers of the rear and front wheels, respectively, Kpr and Kpa are the coefficients of stiffness of the tires of the front and rear wheels, respectively, and n is a sampling instant corresponding to a temporal shift between the rear and front wheels subjected to the same portion of the roadway;

the estimation means are adapted to estimate said coefficients of stiffness based on a model in discrete time of the reset accelerations of the front and rear wheels according to the equation:

$$Ava(k) = \frac{1}{mra}(mrr \times Avr(k+n) \quad Zvr(k+n) - Zva(k))$$

$$\begin{pmatrix} Kpa(k)/Kpr(k) \\ Kpa(k) \end{pmatrix}$$

where k is the $k^{th}$ sampling instant, Avr and Ava are the vertical accelerations of the rear and front wheels, respectively, Zvr and Zva are the altitudes of the centers of the rear and front wheels, respectively, Kpr and Kpa are coefficients of stiffness of the tires of the rear and front wheels, respectively, and n is a sampling instant corresponding to a temporal shift between the rear and front wheels subjected to the same portion of the roadway;

the estimation means are adapted to estimate said coefficients of stiffness from a bicycle mechanical model thereof;

the estimation means are adapted to estimate said coefficients of stiffness based on a model in discrete time of the reset accelerations of the front and rear wheels according to the equation:

$$Avr(k) = \begin{pmatrix} \frac{mra}{mrr} Ava(k-n) \\ \frac{1}{mrr}(Zva(k-n) - Zvr(k)) \\ \frac{1}{mnr} \dot{Z}va(k-n) \\ -\frac{1}{mrr} \dot{Z}vr(k) \end{pmatrix}^T \begin{pmatrix} Kpr(k)/Kpa(k) \\ Kpr(k) \\ (Kpr(k)/Kpa(k)) \times Ra(k) \\ Rr(k) \end{pmatrix}$$

where k is the $k^{th}$ sampling instant, Avr and Ava are the vertical accelerations of the rear and front wheels, respectively, Zvr and Zva are the altitudes of the centers of the rear and front wheels, respectively, Kpr and Kpa are coefficients of stiffness of the tires of the rear and front wheels, respectively, n is a sampling instant corresponding to a temporal shift between the rear and front wheels subjected to the same portion of the roadway, Ra and Rr are coefficients of stiffness of the suspensions of the front and rear wheels, respectively, and $\dot{Z}va$ and $\dot{Z}vr$ are first derivatives of the altitudes of the centers of the front and rear wheels, respectively;

it further comprises means for diagnosing the operating state of the means for acquiring the vertical accelerations of the front and rear wheels adapted to diagnose the operating states thereof by testing their coherence over a predetermined time period;

the diagnostic means are adapted to calculate the frequency spectra of the accelerations supplied by the acquisition means, compare these spectra and diagnose a defective state of the acquisition means if the spectra differ by more than a predetermined value; and the diagnostic means are further adapted to predict one of the accelerations of the front and rear wheels as a function of the other of these accelerations supplied by the acquisition means and to diagnose a defective state of the acquisition means if, in addition, the predicted acceleration and the acceleration used for this prediction are not coherent.

The invention will be better understood by reading the following description made by way of example only in reference to the annexed drawings in which.

The system according to the invention is based on a mechanical model of the interactions between the body C of a vehicle, having a mass Mc, the wheels R of this vehicle, and the ground S.

Figure 1:
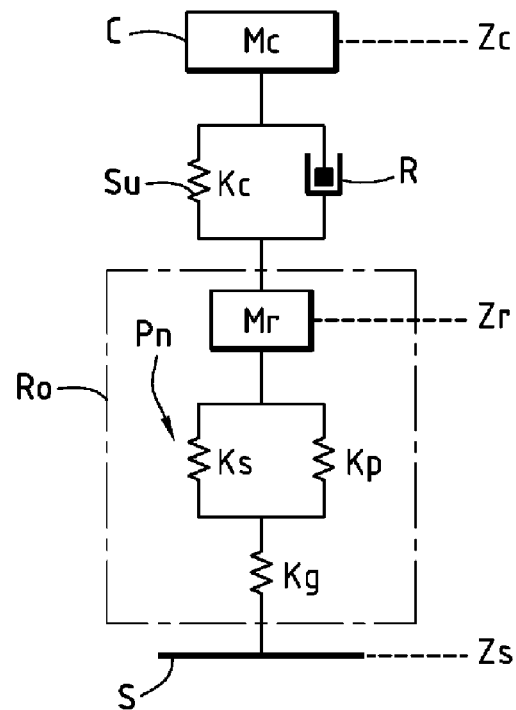
FIG. 1 is a schematic view of a mechanical model used in a first embodiment of a system according to the invention.

A first example of a mechanical model of these interactions is illustrated on FIG. 1, which is a schematic view of a model of the "mono-wheel" type of the interactions between a wheel Ro of the vehicle, the body C of this vehicle, and the ground S.

As shown on this Figure, in this model with two degrees of freedom, the body C of the vehicle is likened to a mass Mc suspended to the wheel Ro having a mass Mr by a suspension Su assimilated to a spring/shock absorber set having a stiffness Kc and a damping coefficient R.

The wheel Ro and the body C move along a vertical direction and are located at altitudes Zr and Zc, respectively, with respect to a reference level, for example, the altitude of the ground when the vehicle starts.

The wheel Ro carries a tire Pn set on the ground S and likened to a spring having a stiffness K composed of a spring that models the envelope of the tire Pn having a structural stiffness Ks in parallel with a spring that models the gas contained in the tire having a pneumatic stiffness Kp, this set being in series with a spring that models the rubber of the tire having a rubber stiffness Kg.

The behavior of this mechanical system is controlled by the evolution with time of the altitude Zs of the ground with respect to the reference level, i.e., the profile of the roadway.

Further, it is known that the inflating pressure Pg of the tire is directly linked to the pneumatic stiffness Kp of this tire, and this dependency can be modeled, for example, according to the equation:

$$Pg = \left(\frac{Kg}{c}\right)^{-\alpha} \quad (1)$$

where c and α are predetermined constants, for example, substantially equal to 6.7 and 0.85, respectively, for a given tire.

Figure 2:
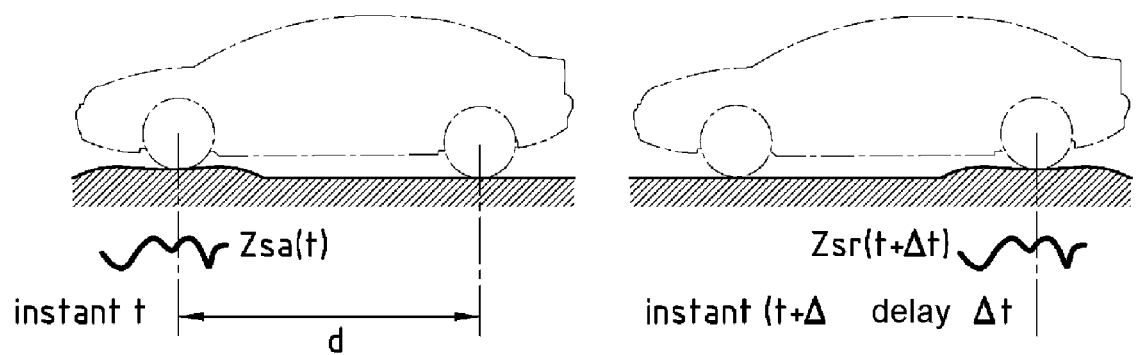
FIG. 2 is a schematic view illustrating the calculation hypothesis used by the system according to the invention.

This system according to the invention is also based on the following observation presented on FIG. 2, which illustrates the progress of a vehicle on a roadway between two instants t and t+Δt.

As illustrated on this Figure, the front and rear wheels of the vehicle are subjected most of the time to the same profile of the roadway, with a temporal shift Δt that depends on the speed V and the wheel base d of the vehicle.

To determine the coefficients of stiffness of the tires, and thus, the inflating pressure of these tires, as will appear in more details in the following, the system according to the invention is then advantageously based on the following equation:

$$Z_{sa}(t) = Z_{sr}(t + \Delta t) \quad (2)$$

Where t is the time, Δt is the time period separating the passage of a rear wheel on a location on the roadway, from the passage of a front wheel at this same location, $Z_{sa}$ is the altitude of the ground in the area of the front wheel, and $Z_{sr}$ is the altitude of the ground in the area of the rear wheel.

Figure 3:
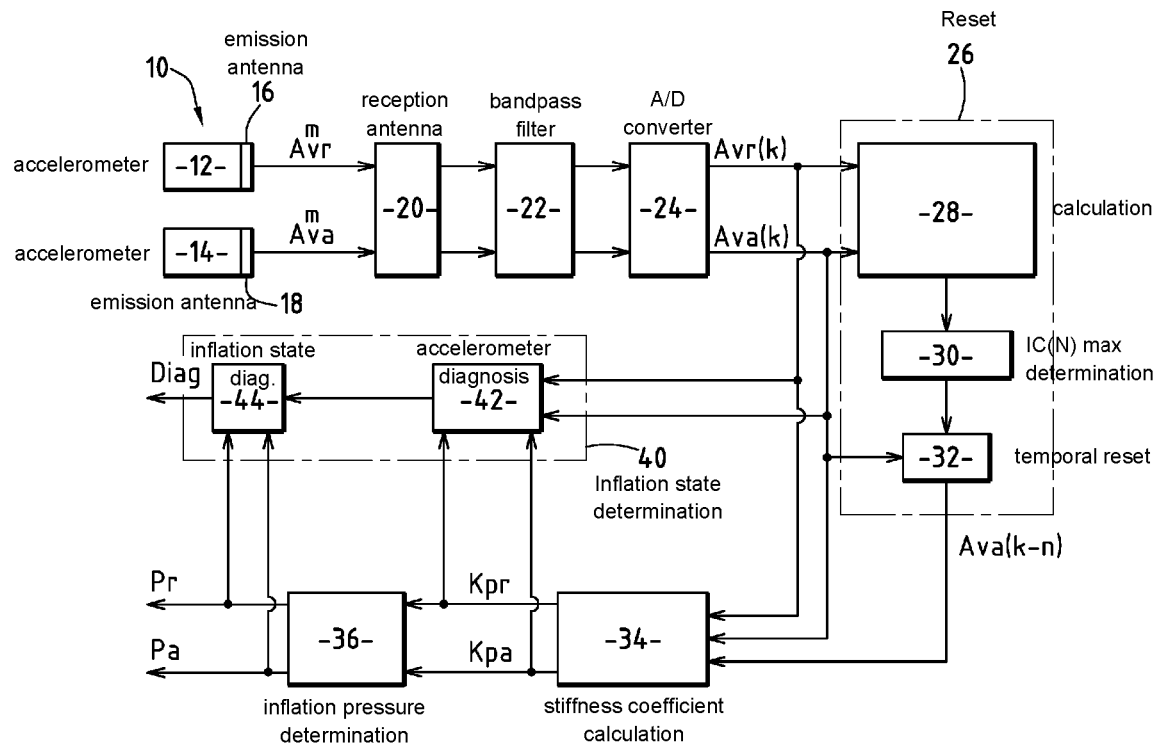
FIG. 3 is a schematic view of a first embodiment of the system according to the invention.

FIG. 3 illustrates schematically with general reference numeral 10 a first embodiment of the system according to the invention for determining the inflating pressures of the tires mounted on a front wheel and a rear wheel of a motor vehicle, arranged on a same side of this vehicle.

This system 10 comprises an accelerometer 12, 14 with which each of the wheels is equipped to measure the vertical acceleration Avr, Ava of this wheel at its center. This accelerometer 12, 14 is, for example, a mono-axis or tri-axis accelerometer mounted at the center of the wheel and comprising means 16, 18 forming emission antenna to supply a high frequency electromagnetic signal representative of the vertical acceleration Avr, Ava at the center of the wheel.

Means 20 forming reception antenna are provided in the system 10 to receive the signals emitted by the accelerometers 12, 14 and to extract from these signals the accelerations Avr, Ava measured by these accelerometers.

The means 20 are connected to a passband filter 22 adapted to process the accelerations Avr, Ava of the wheels supplied by the means 20 by applying to them a passband filtering operation. This filtering operation is performed in a range of frequencies in which the power of the modes of the front and rear wheels is essentially concentrated. This range of frequencies corresponds to the range of rolling resistance and it is, for example, substantially equal to the range [8; 20] Hz.

The passband filter 22 is further connected to an analog/digital converter 24, for example, a zero-order blocker sampler, adapted to digitalize the filtered accelerations at a predetermined sampling frequency fe, for example, comprised between about 50 Hz and 1000 Hz, and thus, to supply as output digital accelerations Avr(k), Ava(k) of the front and rear wheels, where k represents the $k^{th}$ sampling instant.

Of course, a different arrangement of the elements that have just been described is possible. Sampling of the accelerations can be applied, for example, before a passband filtering operation performed in discrete time.

The system 10 according to the invention also includes temporal resetting means connected to the converter 24 and adapted to temporally reset the digital acceleration Ava(k) of the front wheel on the digital acceleration Avr(k) of the rear wheel to supply as output reset accelerations Avr(k), Ava(k−n) of the front and rear wheels, corresponding to the same altitude of the ground in order to apply the hypothesis according to the above-described equation (2).

To this effect, these resetting means 26 comprise calculation means 28 adapted to estimate the digital inter-correlation IC(N) of the accelerations Avr(k), Ava(k) supplied by the converter 24 according to the equation:

$$IC(N) = \sum_{k=-\infty}^{+\infty} Avr(k) \times Ava(N-k) \quad (3)$$

The calculation means 28 are adapted to perform an estimator of this inter-correlation, as is known in itself in the field of signal processing.

The resetting means 26 also comprise, connected to the calculation means 28, means 30 for determining the maximum of the inter-correlation IC(N) and of the sampling instant n corresponding to this maximum. This instant n thus corresponds to the temporal shift n/fe between the front and rear wheels subjected to the same portion of the roadway.

Temporal resetting means 32 are connected to the means 30 and to the converter 24, and they are adapted to apply a delay of n samples to the acceleration Ava(k) of the front wheel and thus to supply an acceleration Ava(k−n) temporally reset on the acceleration Avr(k) of the rear wheel.

The system 10 further comprises means 34 for estimating coefficients of pneumatic stiffness Kpn, Kpa of the front and rear wheels. These means 34 are connected to the converter 24 to receive the accelerations Avr(k), Ava(k) of the rear and front wheels and to the resetting means 26 to receive the reset acceleration Ava(k−n) of the front wheel. The means 34 are adapted to estimate said coefficients of stiffness Kpa, Kpn as a function of the accelerations they receive.

The means 34 are based on the mechanical model of FIG. 1 to model the dynamic behavior of the front and rear wheels.

More particularly, by using the fundamental principle of dynamics applied to this model in relation to the hypothesis according to the equation (2), it can be shown that the vertical accelerations Avr(k), Ava(k) of the centers of the wheels can be modeled in discrete time according to the equations:

$$Avr(k) = \frac{1}{mrr}(mra \times Ava(k-n) \quad Zva(k-n) - Zvr(k)) \quad (4)$$
$$\begin{pmatrix} Kpr(k)/Kpa(k) \\ Kpr(k) \end{pmatrix}$$

$$Ava(k) = \frac{1}{mra}(mrr \times Avr(k+n) \quad Zvr(k+n) - Zva(k)) \quad (5)$$
$$\begin{pmatrix} Kpa(k)/Kpr(k) \\ Kpa(k) \end{pmatrix}$$

where mrr and mra are the masses of the rear and front wheels, respectively, and Zvr and Zva are the altitudes of the centers of the rear and front wheels, respectively, with respect to a reference level.

The estimation means 34 are adapted to perform a recursive least square algorithm in real time based on the equation (4), according to equations:

$$\hat{\theta}(k+1) = \hat{\theta}(k) + K(k+1)(Avr(k+1) - A(k+1)\hat{\theta}(k)) \quad (6)$$

$$K(k+1) = \overline{\omega}^{-1}S(k)X^T(k+1)(\sigma^2(k) + \overline{\omega}^{-1}A(k+1)S(k)A^T(k+1))^{-1} \quad (7)$$

$$S(k+1) = \overline{\omega}^{-1}(S(k) - K(k+1)A(k+1)S(k)) \quad (8)$$

$$X(k+1) = E(A^T(k+1)A(k+1))^{-1} \quad (9)$$

$$\sigma(k) = \text{Var}(e(k)) \quad (10)$$

where $(\bullet)^T$ is the symbol of the transposed, $\hat{\theta}(k)$ is the estimate of the vector of the parameters $$\theta = \begin{pmatrix} Kpr/Kpa \\ Kpr \end{pmatrix}$$

at the instant k, A(k) is the regression vector $$\begin{pmatrix} \frac{mrr}{mra}Avr(k+n) & \frac{1}{mra}(Zva(k-n) - Zvr(k)) \end{pmatrix}$$

at instant k, $E(A^T(k)A(k))$ is the variance of the vector $A^T$ at the instant k, Var(e(k)) is the variance of the estimation error $e(k) = Avr(k) - A(k)\hat{\theta}(k)$ at instant k, $\overline{\omega}$ is a predetermined forget factor, and K(k), X(k) and S(k) are intermediate vectors or matrices used during the estimation of the vector θ.

Preferably, the means 34 are adapted to calculate the altitudes Zvr(k), Zva(k−n) of the centers of the rear and front wheels at each sampling instant as a function of the vertical accelerations Avr(k) and Ava(k−n), for example, by performing a double integration of these accelerations after their filtering between 8 Hz and 20 Hz. Another example of a calculation of the altitude of a wheel as a function of its vertical acceleration is described in French patent application FR 2 858 267 in the name of the applicant.

As a variant, the estimation means 34 are adapted to perform a recursive least square algorithm in real time based on the equation (5) in a manner analogous to that described previously.

As a variant, the means 34 are adapted to perform an inversion or deconvolution algorithm based on the equation (4) or (5) to estimate the coefficients of stiffness.

The estimation means 34 are thus adapted to supply at each sampling instant estimated values Kpa(k) and Kpr(k) of the coefficients of pneumatic stiffness of the front and rear wheels.

The system 10 also comprises means 36 for determining the inflating pressures Pa(k), Pr(k) of the tires of the front and rear wheels connected to the estimation means 34. These means 36 receive the estimated values Kpa(k) and Kpr(k) and are adapted to calculate, as a function of these estimated values, the inflating pressures Pa(k) and Pr(k) of the front and rear wheels, for example from equation (1).

For example, the inflating pressures Pa and Pr are tabulated in the means 36 as a function of the coefficients of pneumatic stiffness Kpa and Kpn, respectively, or the means 36 are adapted to evaluate the function according to the equation (1) as a function of the values of the coefficients of stiffness that they receive.

Finally, the system 10 comprises means 40 for diagnosing the inflating state of the tires of the front and rear wheels. These means 40 are, for example, connected to the estimation means 34, to the converter 24, and to the determination means 36 to receive the estimated coefficients of stiffness, the vertical accelerations Avr(k), Ava(k) of the rear and front wheels and the inflating pressures Pa(k), Pr(k), and they are adapted to determine, as a function thereof, the operating state of the accelerometers 12, 14 as well as the inflating states of the tires (under-inflated, over-inflated, flat . . . ).

More particularly, the means 40 comprise means 42 for diagnosing the operating states of the accelerometers adapted to test the coherence of the accelerations Avr(k) and Ava(k) with each other over a predetermined time period, comprised, for example, between 5 minutes and 10 minutes. As has been described previously, it is known that the vertical accelerations of the front and rear wheels are coherent since the wheels are subjected to the same portion of the roadway with a temporal shift.

For example, the means 42 are adapted to calculate the frequency spectra of these accelerations by means of a fast Fourier transform of the accelerations comprised in the predetermined time period and to compare the calculated spectra. If these spectra differ by more than a predetermined value, for example, in quadratic error, then the accelerometers are diagnosed by the means 42 as being defective.

For additional robustness in the diagnostic of the operating states of the accelerometers, as a variant, the means 42 are additionally adapted to predict the vertical acceleration of the rear wheel as a function of the vertical acceleration of the front wheel supplied by the converter 24 and of the coefficients of stiffness of the front and rear wheels calculated by the means 34 from the equation (4) by varying the sampling instant n. The means 44 are also adapted to test the coherence between this predicted acceleration of the rear wheel and the acceleration of the front wheel supplied by the converter 24, for example, in the manner described previously for the accelerations supplied by the converter 24.

If, in addition, the coherence between these accelerations is not established, then the means 42 diagnose a dysfunction of the accelerometers 12, 14.

The means 40 also comprise means 44 for diagnosing the inflating state of the tires as a function of the estimated inflating pressures Pa(k), Pr(k).

For example, the means 44 are adapted to compare each of these pressures to a predetermined set of pressure intervals, each being representative of an inflating state of the tire (flat, under-inflated, normally inflated, over-inflated). The means 44 thus determine the inflating state of the tire associated with this pressure as a function of whether this pressure belongs to one of the pressure intervals.

The means 40 can further comprise means for supplying these data to the driver of the vehicle, for example, light indicators arranged on the dashboard of the vehicle and/or a sound alarm of the bad inflating state of the tires or of the defective state of the accelerometers.

An embodiment has just been described that is based on a mono-wheel mechanical model of a motor vehicle wheel as illustrated on FIG. 1.

Other embodiments of the system according to the invention, based on other models, are of course possible. Such embodiments are structurally identical to that illustrated on FIG. 3; only the algorithm performed by the estimation means 34 is modified.

Figure 4:
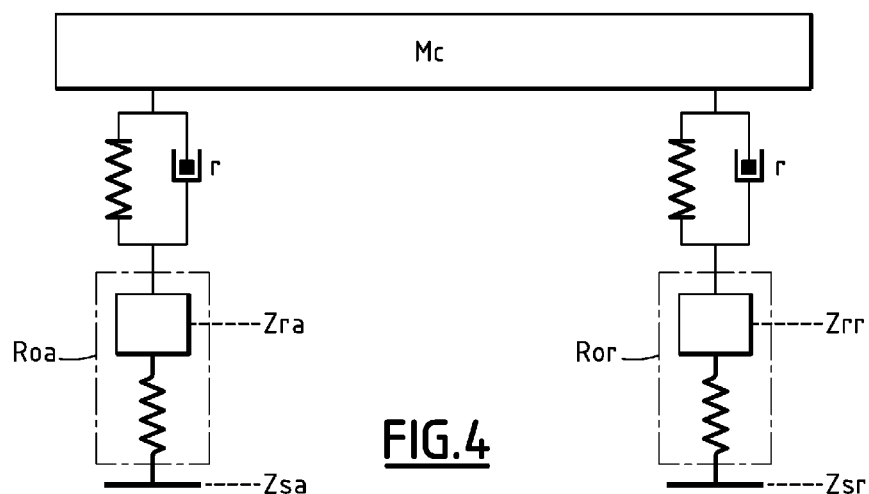
FIG. 4 is a schematic view of a second mechanical model used by a second embodiment of a system according to the invention.

For example, as a variant, the system is based on the mechanical model illustrated on FIG. 4. FIG. 4 is a schematic view of a mechanical model generally designated by the expression "bicycle model." This type of model makes it possible in particular to take into account the case of active suspensions with which the vehicle is equipped and applies to front and rear wheels arranged on the same side of the vehicle.

The difference with the model of FIG. 1 resides in that the body C of the vehicle is assimilated to a mass Mc suspended both to the front wheel Roa and to the rear wheel Ror.

Based on the fundamental principle of dynamics applied to this bicycle model and on the hypothesis according to the equation (2), it can be shown that the vertical accelerations Ava(k), Avr(k) of the front and rear wheels can be modeled in discrete time according to the equation:

$$Avr(k) = \begin{pmatrix} \frac{mra}{mrr}Ava(k-n) \\ \frac{1}{mrr}(Zva(k-n) - Zvr(k)) \\ \frac{1}{mnr}\dot{Z}va(k-n) \\ -\frac{1}{mrr}\dot{Z}vr(k) \end{pmatrix}^T \begin{pmatrix} Kpr(k)/Kpa(k) \\ Kpr(k) \\ (Kpr(k)/Kpa(k)) \times Ra(k) \\ Rr(k) \end{pmatrix} \quad (11)$$

where Ra and Rr are coefficients of stiffness of the suspensions of the front and rear wheels, respectively, and $\dot{Z}$va and $\dot{Z}$vr are the first derivatives of the altitudes of the centers of the front and rear wheels, respectively, i.e., the vertical movement speed of these wheels.

The estimation means 34 are then adapted to perform a recursive least square algorithm in real time based on the equation (11).

This algorithm is analogous to that described previously (equations (6) (10)), the vector of the parameters being defined by the equation $$\theta = \begin{pmatrix} Kpr/Kpa \\ Kpr \\ (Kpr/Kpa) \times Ra \\ Rr \end{pmatrix} \quad (12)$$

and the regression vector being defined by the equation:

$$A(k) = \left(\frac{mra}{mrr}Ava(k-n)\frac{1}{mrr}\right. \quad (13)$$
$$\left.(Zva(k-n) - Zvr(k))\frac{1}{mnr}\dot{Z}va(k-n) - \frac{1}{mrr}\dot{Z}vr(k)\right)$$

The altitudes Zvr(k) and Zva(k−n) of the centers of the wheels with respect to the reference levels and their first derivatives $\dot{Z}$vr(k), $\dot{Z}$va(k−n) are calculated at each sampling step in a manner analogous to the first embodiment, for example, by integrating the corresponding vertical accelerations or in a manner as described in French patent application FR 2 858 267.

As it can be observed, the application of the recursive least square algorithm in real time based on the bicycle model makes it possible to estimate simultaneously the coefficients of pneumatic stiffness Kpa, Kpr as well as the coefficients of stiffness Ra and Rr of the suspensions.

Figure 5A:
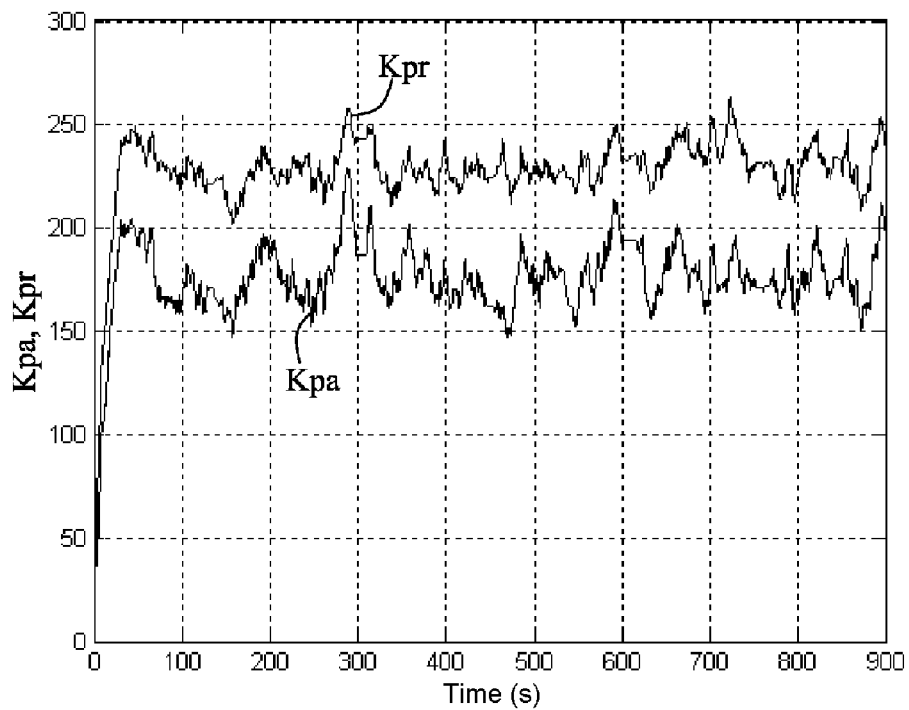
FIGS. 5 to 7 are graphs of temporal variation of the coefficients of pneumatic stiffness of front and rear wheels estimated by the system according to the invention.
Figure 5B:
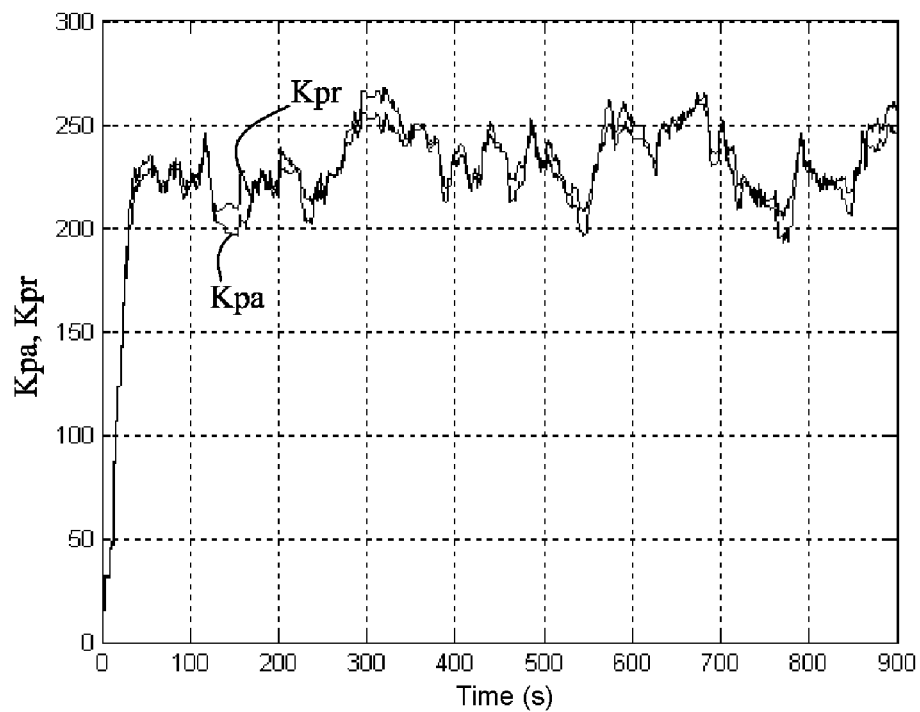
Figure 6:
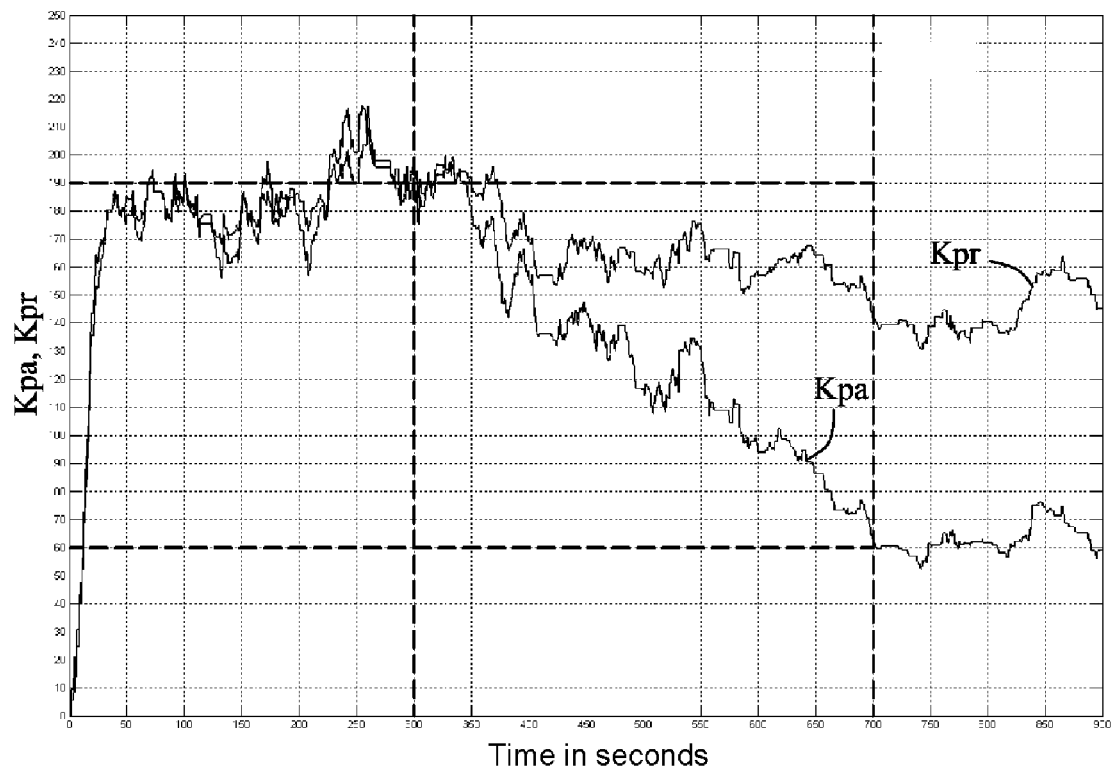
Figure 7:
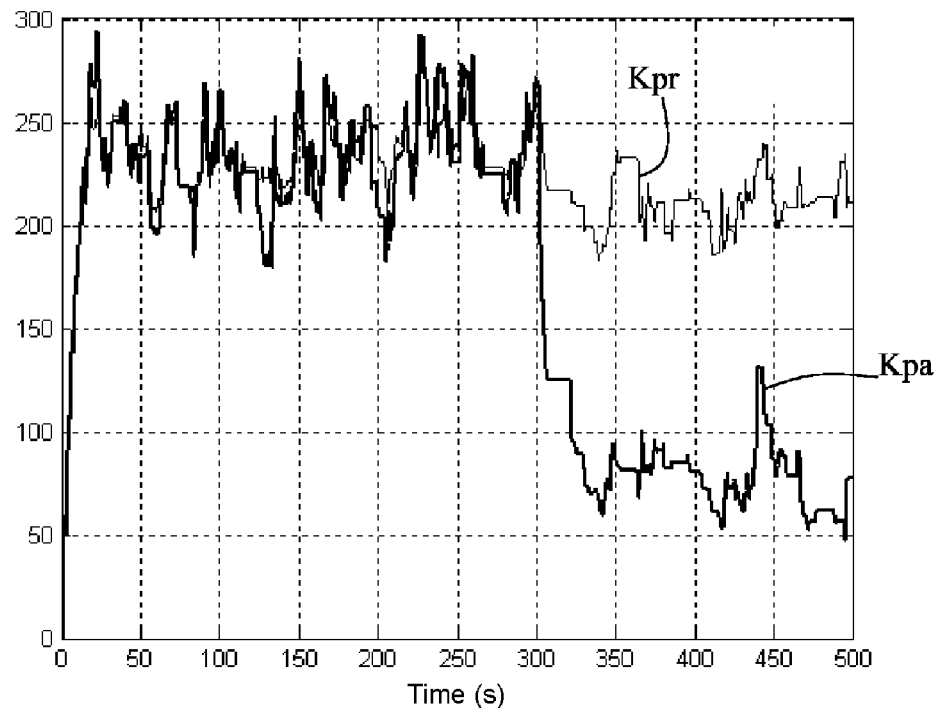

Examples of estimation of the coefficients of stiffness Kpa, Kpr of the front and rear wheels by the first embodiment of the system according to the invention are illustrated on the graphs of FIGS. 5 to 7.

FIGS. 5A and 5B are graphs of temporal variations of the coefficients of pneumatic stiffness Kpa, Kpr of the front and rear wheels arranged on the left side of the vehicle and of the front and rear wheels arranged on the right side of the vehicle, respectively, the tires of the front wheels of the vehicle being inflated at a pressure of 2.4 bar, the tire of the left rear wheel being inflated at a pressure of 3 bar and the tire of the right rear wheel being inflated at a pressure of 2.4 bar.

FIG. 6 is a graph of temporal variations of the coefficients of pneumatic stiffness Kpa, Kpr of the front and rear wheels arranged on the right side of the vehicle, the tires of these wheels being initially inflated at a pressure of 2.5 bar and the tire of the front wheel being subjected to a pressure drop of 4 mbar/s over 400 s from the instant t=300 s.

FIG. 7 is a graph of the temporal variations of the coefficients of pneumatic stiffness Kpa, Kpr of the front and rear wheels arranged on the right side of the vehicle, the tires of these wheels being initially inflated at a pressure of 2.5 bar and the tire of the front wheel being subjected to a quasi-instantaneous pressure drop of 1.6 bar, here, over a time period of 1 s at the instant t=300 s.

It is understood, then, that the system according to the invention determines in a reliable manner the coefficients of pneumatic stiffness and the associated inflating pressures.

A system according to the invention has been described that is associated to a pair of front and rear wheels of a motor vehicle, arranged on a same side of this vehicle. Of course, it will be understood that this system can also apply to each of the pairs of front and rear wheels arranged on a same side of the vehicle.

The invention claimed is:

1. System for determining the inflation pressures of tires mounted on motor vehicle wheels, the system including:
   means for acquiring vertical accelerations of a front wheel and of a rear wheel of the vehicle;
   means for temporally resetting one of the acquired accelerations or the other of the acquired accelerations, and
   means for estimating coefficients of stiffness of said tires of said wheels as a function of the thus temporally reset accelerations.

2. System according to claim 1, wherein the means for temporally resetting comprise means for calculating an inter-correlation of the acquired accelerations and means for applying a delay corresponding to a maximum of the calculated inter-correlation to the acquired acceleration of the front wheel.

3. System according to claim 1, wherein the means for estimating perform a recursive least square algorithm in real time to estimate said coefficients of stiffness.

4. System according to claim 1, wherein the means for estimating perform an inversion or deconvolution algorithm to estimate said coefficients of stiffness.

5. System according to claim 1, further comprising means for bandpass filtering the acquired accelerations, said means for bandpass filtering being arranged between said means for acquiring the accelerations and said means for temporally resetting.

6. System according to claim 5, wherein the means for bandpass filtering perform filtering in a range of frequencies substantially equal to [8, 20] Hz.

7. System according to claim 1, wherein the means for estimating estimate said coefficients of stiffness from a mono-wheel mechanical model of the front and rear wheels.

8. System according to claim 7, wherein the means for estimating estimate said coefficients of stiffness based on a model in discrete time of the reset accelerations of the front and rear wheels according to the equation:

$$Avr(k) = \frac{1}{mrr}(mra \times Ava(k-n) \quad Zva(k-n) - Zvr(k))$$
$$\begin{pmatrix} Kpr(k)/Kpa(k) \\ Kpr(k) \end{pmatrix}$$

where k is the $k^{th}$ sampling instant, Avr and Ava are the vertical accelerations of the rear and front wheels, respectively, Zvr and Zva are altitudes of centers of the rear and front wheels, respectively, Kpr and Kpa are coefficients of stiffness of the of the rear and front wheels, respectively, and n is a sampling instant corresponding to a temporal shift between the rear and front wheels subjected to a same portion of the roadway.

9. System according to claim 7, wherein the means for estimating estimate said coefficients of stiffness based on a model in discrete time of the reset accelerations of the front and rear wheels according to the equation:

$$Ava(k) = \frac{1}{mra}(mrr \times Avr(k+n) \quad Zvr(k+n) - Zva(k))$$
$$\begin{pmatrix} Kpa(k)/Kpr(k) \\ Kpa(k) \end{pmatrix}$$

where k is the $k^{th}$ sampling instant, Avr and Ava are the vertical accelerations of the rear and front wheels, respectively, Zvr and Zva are altitudes of centers of the rear and front wheels, respectively, Kpr and Kpa are coefficients of stiffness of tires of the rear and front wheels, respectively, and n is a sampling instant corresponding to a temporal shift between the rear and front wheels subjected to a same portion of the roadway.

10. System according to claim 1, wherein the means for estimating estimate said coefficients of stiffness from a bicycle mechanical model thereof.

11. System according to claim 10, wherein the means for estimating estimate said coefficients of stiffness based on a model in discrete time of the reset accelerations of the front and rear wheels according to the equation:

$$Avr(k) = \begin{pmatrix} \frac{mra}{mrr} Ava(k-n) \\ \frac{1}{mrr}(Zva(k-n) - Zvr(k)) \\ \frac{1}{mnr} \dot{Z}va(k-n) \\ -\frac{1}{mrr} \dot{Z}vr(k) \end{pmatrix}^T \begin{pmatrix} Kpr(k)/Kpa(k) \\ Kpr(k) \\ (Kpr(k)/Kpa(k)) \times Ra(k) \\ Rr(k) \end{pmatrix}$$

where k is the $k^{th}$ sampling instant, Avr and Ava are the vertical accelerations of the rear and front wheels, respectively, Zvr and Zva are altitudes of centers of the rear and front wheels, respectively, Kpr and Kpa are coefficients of stiffness of tires of the rear and front wheels, respectively, n is a sampling instant corresponding to a temporal shift between the rear and front wheels subjected to a same portion of the roadway, Ra and Rr are coefficients of stiffness of suspensions of the front and rear wheels, respectively, and $\dot{Z}va$ and $\dot{Z}vr$ are first derivatives of the altitudes of the centers of the front and rear wheels, respectively.

12. System according to claim 1, further comprising means for diagnosing an operating state of the means for acquiring the vertical accelerations of the front rear wheels, wherein said means for diagnosing diagnose operating states thereof by testing their coherence over a predetermined time period.

13. System according to claim 12, wherein the means for diagnosing calculate frequency spectra of the accelerations supplied by the means for acquiring, compare these spectra and diagnose a defective state of the means for acquiring if the spectra differ by more than a predetermined value.

14. System according to claim 12, wherein the means for diagnosing predict one of the accelerations of the front and rear wheels as a function of the other of these accelerations supplied by the means for acquiring and diagnose a defective state of the means for acquiring if, in addition, the predicted acceleration and the acceleration used for this prediction are not coherent.

* * * * *